June 6, 1933.   J. R. OISHEI ET AL   1,912,994

AUTOMATIC WINDSHIELD CLEANER

Original Filed April 19, 1924

INVENTORS
John R. Oishei
and Erwin C. Horton
by Parker, Brockwood & Bean
ATTORNEYS.

Patented June 6, 1933

1,912,994

UNITED STATES PATENT OFFICE

JOHN R. OISHEI, OF BUFFALO, AND ERWIN C. HORTON, OF HAMBURG, NEW YORK, ASSIGNORS, BY DIRECT AND MESNE ASSIGNMENTS, TO TRICO PRODUCTS CORPORATION, OF BUFFALO, NEW YORK

AUTOMATIC WINDSHIELD CLEANER

Application filed April 19, 1924, Serial No. 707,575. Renewed February 3, 1932.

This invention relates to automatic windshield cleaners of the fluid pressure type, such for example as the so called "suction" operated windshield cleaner comprising generally a wiper member or members adapted to be moved on the windshield glass to clean the same, and a small fluid pressure motor for moving the wiper member or members, and a conduit connecting the fluid pressure motor to a source of suction, usually the intake manifold of the vehicle engine.

The so called "suction" or partial vacuum in the intake manifold of a vehicle engine varies within considerably wide limits. For example, when the throttle valve of the vehicle engine is closed the vacuum condition in the intake manifold is more nearly complete than when the throttle valve is open. These conditions have resulted, in the devices heretofore in use, in a highly undesirable variation in speed of movement of the windshield wiping member or members. In some of these devices, when the partial vacuum condition in the intake manifold is at its lowest point of efficiency, the power applied to the cleaner is insufficient to move it across the windshield glass. Again, when the throttle is closed and the partial vacuum condition at its most effective point, with some of these devices heretofore in use, a very undesirable racing effect of movement of the wiper strip on the windshield glass is induced. This action gives a very rapid movement of the wiper member when the vehicle is not in motion or is moving slowly and when the vehicle is in very rapid motion, a very slow movement of the wiper member or a complete stoppage of movement of that member. As a rule, when the vehicle is in rapid motion more moisture impinges on the windshield than when the vehicle is standing or moving slowly. Therefore, the most desirable action is to effect a slight acceleration in rate of movement of the wiper member as the speed of travel of the vehicle increases so as to take care of the increased amount of moisture accumulating on the windshield glass at higher speeds.

The objects of the present invention are to provide a fluid pressure operated windshield wiper in which the windshield wiper member or members are caused to travel at a substantially uniform rate of speed, against increased partial vacuum condition in the intake manifold of the vehicle engine above a predetermined normal: also to provide a fluid pressure operated windshield wiper in which the rate of movement of the wiper member on the windshield glass will automatically increase or accelerate slightly as the rate of motion of the vehicle increases; also to provide a windshield wiper of the type referred to in which the rate of travel of the wiper member is automatically controlled or governed so as to operate substantially uniformly; also to provide an automatic windshield wiper which may be controlled for operation from the instrument board of the motor vehicle; and also to provide improvements in windshield wipers in the other respects hereinafter set forth and claimed.

The windshield wiper of the present invention, generally stated, includes a wiper member adapted to be moved on or across a windshield glass, a casing or the like adapted for connection to a part of the vehicle, preferably the windshield, which casing houses a suitable piston or fluid pressure actuated operating member which moves the wiper on the windshield glass, ports or other means for admitting actuating fluid to the operating member in the casing, and a conduit in or connected to the casing and through which the actuating fluid passes. It also includes a second conduit connected to a source of power, and an automatically movable controlling member which controls and provides a uniform rate of movement of the wiper member by maintaining movement of a substantially uniform quantity of actuating fluid through the first named conduit at a substantially uniform velocity.

In the embodiment of the invention shown, the motor is of the so called "suction" type and the suction conduit is connected to the intake manifold of the vehicle engine or to some point in the suction line between the engine and its fuel supply wherein a partial vacuum exists when the engine is in operation.

Figure 2:
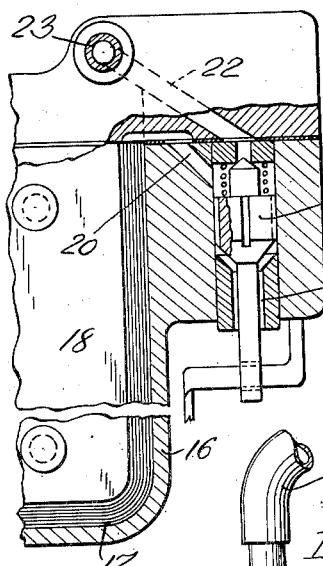
Fig. 2 is a sectional elevation of a portion of the motor of the windshield cleaner shown in Fig. 1.

In the embodiment of the invention shown, 15 designates the wiper member which may be of any suitable type and which is preferably provided with a portion adapted to contact with the windshield glass to clean the same. 16 designates the casing for the motor which actuates the wiper member. This casing has a piston chamber 17 therein and is provided with the usual piston or other fluid pressure actuated operating member for moving the wiper 15. In the drawing the piston is illustrated fragmentarily in Fig. 2 and designated as 18. The atmospheris air or other fluid utilized to operate the device may be admitted to the piston chamber through any suitable means. For example, in Fig. 2, in the type of cleaner illustrated, atmospheric air is admittd through ports 19 and 20, the admission of this air being controlled by he valve 21. In the type of cleaner shown there are ports and valves at opposite sides of the piston chamber, but it is only considered necessary to illustrate one of these. 22 designates a conduit for the air which is being exhausted from the motor during the operation of the device, and 23 designates a continuation of this conduit, which, as shown, may be in the forn of a separate tube.

The conduit 22—23 is of predetermined capacity and the volume and velocity of air moving through that conduit determines the rate of movement of the wiper member 15 on the windshield glass.

Figures 7, 8:
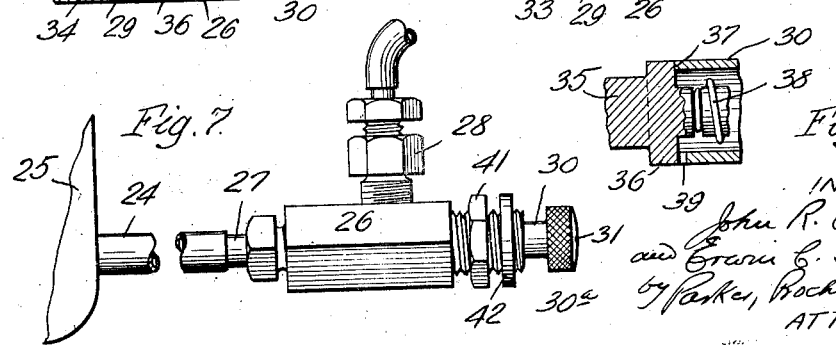
Fig. 7 illustrates the connection between the intake manifold of the vehicle engine and the controlling valve.
Fig. 8 is a section on an enlarged scale through a portion of the controlling valve and one of its seats.

24 designates a conduit, preferably of larger capacity than the conduit 22—23. For purposes of convenience, this conduit may be referred to as the suction conduit, and it is preferably connected to the suction line between the vehicle engine and its fuel supply, or, as shown in Fig. 7, to the intake manifold 25 of the vehicle engine. The suction conduit 24 is preferably of greater diameter than the conduit 22—23, for example, if the conduit 22—23 has a one-eighth inch opening therethrough, the suction conduit 24 may be provided with a one-quarter inch opening therethrough. This results in capacity for moving a larger volume of air through conduit 24 than through conduit 22—23 and in smaller losses of energy per unit of volume by reason of friction of the moving fluid against the side walls of the conduit in the suction conduit 24. The conduits 22—23 and 24 are connected by suitable means so that the actuating fluid may pass from one conduit to the other. In the embodiment shown, this is accomplished by means of a coupling designated generally as 26. For this purpose the coupling 26 may be provided with a nipple 27 on which an end of conduit 24 may be secured, and a securing member 28 for receiving and holding an end of conduit or tube 23. 29 designates a passage by means of which tube 23 and conduit 24 are placed in communication.

The coupling is provided with means for automatically maintaining a flow of actuating fluid of substantially uniform volume and at a substantially uniform velocity through tube 23 when the device is in operation. For this purpose, in the embodiment of the invention shown, the coupling 26 is provided with a port to the atmosphere through passage 29 and screw threaded sleeve 30 at the end of the coupling, the outer end of the port appearing at 31. The sleeve 30 is provided with a head or handle 30a whereby its position in the coupling may be adjusted. The coupling 26 is provided with a passage 32 and a valve seat 33 which cooperate with a head 34 of the valve 35 for controlling the passage of the actuating fluid through the suction conduit 24. The valve 35 preferably has a second head 36 which cooperates with the end 37 of sleeve 30 to control the volume of atmospheric air admitted through port 31 and sleeve 30. When there is not suction in the conduit 24, the head 36 of valve 35 is held against the end of sleeve 30 by means of a tension spring 38.

The sleeve 30 is preferably provided with a notched or cut out portion 39, Fig. 8, by means of which a small quantity of atmospheric air is admitted to the interior of the coupling member. This insures the feeding of a small quantity of air constantly from the atmosphere into suction conduit 24. While the device is in operation the head 36 is lubricated constantly by the air entering through the end 37 of sleeve 30 which passes around the head 36.

Figure 3:
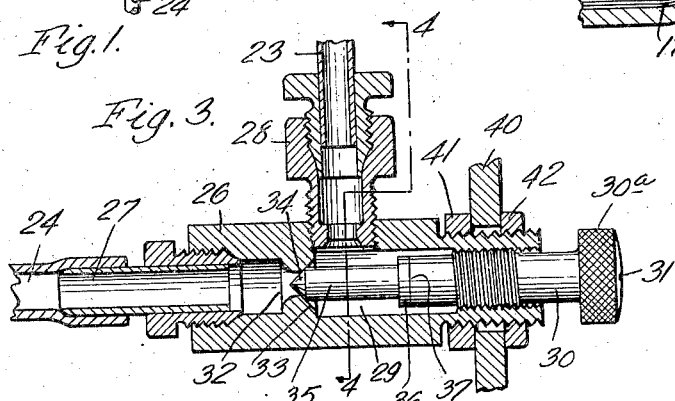
Fig. 3 is a sectional elevation of the controlling valve.
Figure 4:
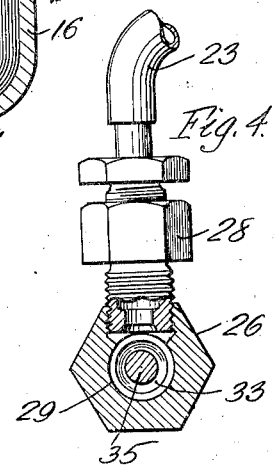
Fig. 4 is a section on line 4—4, Fig. 3.

In the position of the controlling member illustrated in Fig. 3, the suction conduit 24 is cut off from communication with the exhaust conduit 23 and, therefore, the wiper member 15 will not move upon the windshield glass. If, by reason of irregularities of wear, or by reason of any foreign matter adhering to the valve seat 33, the valve head 34 does not properly seat on seat 33 and there is a small leakage of air past the valve seat, the atmospheric air entering through sleeve 30 and the cut-out portion 39 of the valve sleeve 30 is sufficient to prevent any withdrawal of air from the exhaust conduit 23 and will prevent creeping or slow movement of the wiper member 15.

Figures 5, 6:
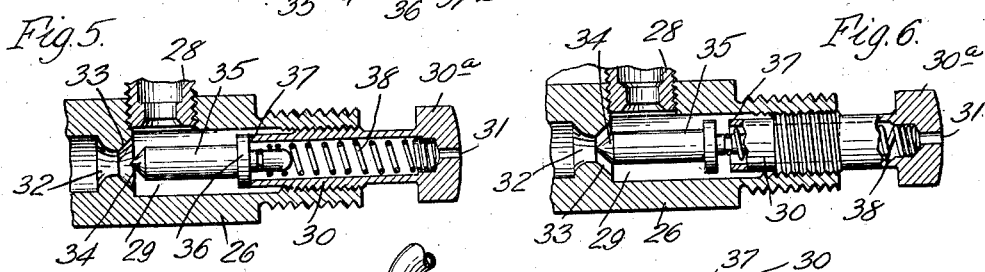
Fig. 5 is a sectional elevation showing the controlling valve in open position.
Fig. 6 is a sectional elevation showing the controlling valve in a different position.

In the position of the device illustrated in Fig. 5, the controller handle has been turned so as to withdraw valve head 34 from valve seat 33, thus establishing communication between the exhaust conduit 22—23 and the suction conduit 24. This permits the windshield wiper to operate when the engine of the vehicle is running. When the engine of the vehicle is started, a vacuum condition of relatively great efficiency is created in the suction conduit 24 and by reason of the difference in pressure, the control valve automatically moves so that its head 36 is spaced from the end of the sleeve 30. At the same time the head 34 of the valve is moved closer to the valve seat 33, thus admitting a greater quantity of atmospheric air through sleeve 30, and by reason of the approach of valve head 34 to its seat 33 setting up greater frictional resistance to the passage of fluid at that point, whereby lesser vacuum conditions prevail in the passage 29 than in the suction conduit 24. This position of the valve is illustrated in Fig. 6. The air from the windshield cleaner motor then moves through conduit 22—23 at a certain velocity. This velocity is maintained constant by the control valve which, as the suction in conduit 24 becomes less, moves toward the right in the embodiment shown in Fig. 5. The desired velocity of fluid through the conduit 22—23 and the consequent desired speed of operation of the wiper member may be obtained by turning the head of the valve sleeve to cause the sleeve 30 to move toward or from the valve seat 33.

The relationship between the form of valve seat 33 and the form of valve head 34 insures that as the valve moves from the position shown in Fig. 6 to the position shown in Fig. 5 or to any intermediate position between the two, that the passage of fluid through the conduit 22—23 will be slightly accelerated. This results in a predetermined rate of movement of the wiper member under conditions when the suction is most efficient, and under such conditions the position of the valve may be as illustrated in Fig. 6 and in a slightly accelerated rate of movement of the wiper member when the suction in conduit 24 becomes less efficient and the valve tends to assume the position shown in Fig. 5.

Figure 1:
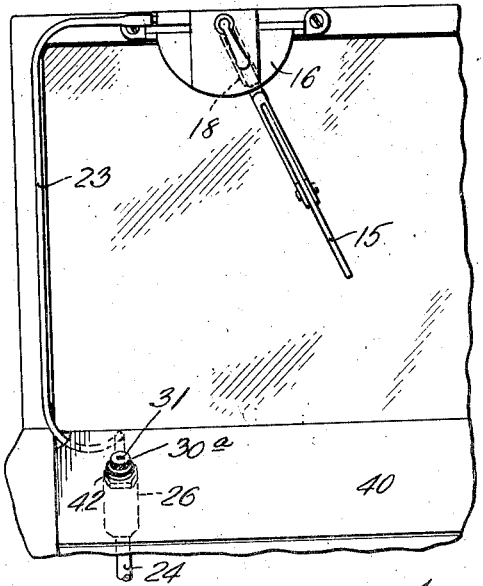
Fig. 1 is an elevation of a portion of the windshield of an automobile showing a device embodying the invention attached thereto.

The controlling member, as shown, may be mounted on the instrument board of the vehicle. As shown in Figs. 1 and 3, 40 designates the instrument board of the vehicle, and 41 and 42 designate two clamping nuts engaging the threaded outer portion of the coupling for securing the coupling in place, preferably so that the body of the coupling is behind the board and only the handle 30a projects on the face of the instrument board.

The operation of the cleaner is started and stopped by turning the knurled handle 30a of the controlling valve in one direction or the other, and the valve may be readily set to ensure any desired rate of movement of the wiper. The desired rate of movement being determined, the control valve automatically holds the speed of the cleaning member substantially to that rate.

The positioning of the controlling member on the instrument board makes it very accessible to the hand of the driver of the vehicle and renders possible the use of a conduit of much greater diameter from the instrument board to the engine whereby a larger volume of suction will be provided adjacent the valve seat 33; which conduit might be unsightly, because of its size, if extending up to the top of the windshield, whereby the rate of movement of the cleaning member may be controlled and governed without decreasing its efficiency under conditions where the suction is not very strong, but it is contemplated that the controlling member may be mounted at other places in communication with the exhaust conduit from the wiper motor.

We claim as our invention:

1. A pressure-unifying control for suction-operated automobile accessories of the type embodying continuously operating motors, comprising a suction passage, a valve seat therein, a valve cooperating with the seat, an offset chamber communicating at one end with the passage and at its opposite end with the atmosphere, a head having a sliding leak-fit in the chamber and operatively connected to the valve for moving the latter toward its seat by atmospheric pressure on the head, manually adjustable means for positively acting on the head to seat the valve, and a retractile spring connecting the valve to the adjustable means whereby a tension may be provided to yieldingly resist the atmospheric pressure action on said head.

2. A pressure-unifying control for suction-operated automobile accessories of the type embodying continuously operating motors, comprising a suction passage, a valve seat therein, a valve cooperating with the seat, an atmospheric passage open at one end to the atmosphere and at its opposite end to said suction passage at the valve side of said seat, a head connected to the valve and having a leak sliding fit in the atmospheric passage whereby atmospheric pressure will act on the head to seat the valve, a spring acting to resist the seating of the valve by said head, and means for positively effecting a seating of the valve.

3. A pressure-unifying control for suction-operated automobile accessories of the type embodying continuously operating motors, comprising a suction passage, a valve seat therein, a valve cooperating with the seat, an atmospheric passage open at one end to the atmosphere and at its opposite end to said suction passage at the valve side of said seat, a head connected to the valve and having a leak sliding fit in the atmospheric passage whereby atmospheric pressure will act on the head to seat the valve, a spring acting to resist the seating of the valve by said head, and an adjustable member for positively seating the valve, said member having an air passage therethrough, said head being adapted to substantially close said air passage under the influence of said spring.

4. A pressure-unifying control for suction-operated automobile accessories of the type embodying continuously operating motors, comprising a suction passage, a valve seat therein, a valve cooperating with the seat, an atmospheric passage open at one end to the atmosphere and at its opposite end to said suction passage at the valve side of said seat, a head connected to the valve and having a leak sliding fit in the atmospheric passage whereby atmospheric pressure will act on the head to seat the valve, a spring acting to resist the seating of the valve by said head, and a tubular member threaded into the atmospheric passage and itself having an air passage therethrough, said head adapted to seat on the inner end of said tubular member for substantially closing the air passage therethrough, said spring being arranged within said tubular member and acting to urge said head into seating engagement with the inner end of said member.

5. A pressure-governing device adapted to operate between a source of variable reduced pressure and a device to be actuated by said reduced pressure at a constant speed, comprising a chamber having a passage connecting with the device to be driven, an air inlet port communicating with the atmosphere, an air exhaust port connected to the source of reduced pressure, valve means acting between said air inlet port and said exhaust port to compensate for an increase in the source of suction by a corresponding reduction in the effective area of the exhaust port and an increase in the effective area of the air inlet port.

6. A control device operating between a source of variable reduced pressure and a mechanism to be driven by said variable pressure at a constant speed, comprising a chamber having a passage connecting with the mechanism to be actuated, an air inlet port communicating with the atmosphere, an air exhaust port connected to the source of reduced pressure, a pair of operably connected valves for automatically adjusting the effective area of the exhaust port and the air inlet port respectively to variations in the source of reduced pressure, said valve means being manually adjustable for regulating the speed of operation of the mechanism to be driven or to entirely discontinue its operation by completely closing said exhaust port.

7. A fluid pressure control device acting between a source of variable reduced pressure and a mechanism to be actuated thereby at a constant speed, comprising a chamber having a passage connecting with the mechanism to be actuated, an air inlet port communicating with the atmosphere, an air exhaust port communicating with the source of reduced presure, resiliently mounted valve means for normally closing said air inlet port and adapted to reduce the effective area of the air exhaust port and correspondingly open said air inlet port when the suction in the chamber exceeds a predetermined maximum.

8. A pressure control for suction-operated automobile accessories of the type embodying continuously operating motors, comprising a chamber having an inlet passage and an outlet passage with a valve seat between said passages, said outlet passage being connected to a source of reduced pressure, said chamber having a third opening leading to the atmosphere, a valve cooperable with the seat to interrupt communication between said passages, a spring acting yieldably to hold the valve off its seat, a head carrying the valve and disposed within the chamber between the seat and the third chamber opening, said head being movable in the chamber under atmospheric pressure as admitted through the third chamber-opening for moving the valve toward its seat and against the urge of said spring and reduced pressure in the chamber, said inlet and outlet passages being arranged to one side of the head, and means for manually adjusting the valve toward and from its seat without flexing said spring.

9. A control device operating between a source of variable reduced pressure and a mechanism to be driven by said variable pressure at a constant speed, comprising a chamber having a passage connecting with the mechanism to be actuated and an exhaust passage communicating with a source of reducing pressure, a valve movable in said chamber to close or open communication between said passages, resilient means for urging said valve to a position to open said communication, said chamber having an atmospheric port for admitting air under atmospheric pressure to said chamber adjacent said valve for urging it to a position closing said communication, and manually adjustable means associated with said valve for positively limiting the movement therof from its position closing said communication without flexing said resilient means.

10. A control device for a vehicle suction line comprising a casing having a fluid inlet passage and a fluid outlet passage whereby the reduced pressure of the suction line may maintain in the casing, a valve movable to close or open communication between said passages, resilient means for urging said valve to communication opening position, said casing having a port for admitting atmospheric air to urge said valve to communication closing position against the opposition of the reduced pressure in the casing and the resilient means, and means adjustable for positively retaining said valve in said communication closing position or adjustable to positively limit its movement from said communication closing position, said means being manually adjustable.

11. A control device for a suction line, comprising a casing having an inlet port and having an outlet port connected to a source of suction, whereby reduced pressure of the suction line may maintain in the casing, an atmospheric port in said casing, a valve between the atmospheric port and said first mentioned ports, said valve being movable toward or away from said outlet port for closing or opening fluid communication between the outlet and inlet ports, spring means for moving said valve in a direction away from said outlet port, and manually adjustable means for varying the distance between the valve and the outlet port without flexing said spring means, whereby said spring means will resist movement of the valve toward the outlet port with constant force when the valve is in any position of manual adjustment.

12. A control device for a suction line comprising a casing having an inlet passage and having an outlet passage for connection to a source of sub-atmospheric pressure, a valve seat in said casing between the inlet passage and the outlet passage, a valve, manually operable means for moving the valve toward and from said seat to restrict and open fluid communication between the inlet and outlet passages, resilient means connecting the valve to said manually operable means for movement therewith toward or from said seat and for permitting the valve to move relative to the manually operable means toward said seat, and means for admitting atmospheric pressure against said valve to urge it in opposition to said resilient means and the sub-atmospheric pressure to move the valve relative to the manually adjustable means and toward the seat for restricting fluid communication between said inlet and outlet passages.

JOHN R. OISHEI.
ERWIN C. HORTON.